United States Patent
Sugiyama

(10) Patent No.: US 9,150,112 B2
(45) Date of Patent: Oct. 6, 2015

(54) POWER SUPPLY SYSTEM FOR ELECTRIC POWERED VEHICLE AND METHOD FOR CONTROLLING THE SAME

(75) Inventor: Yoshinobu Sugiyama, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 20 days.

(21) Appl. No.: 14/237,257

(22) PCT Filed: Oct. 4, 2011

(86) PCT No.: PCT/JP2011/072837
§ 371 (c)(1),
(2), (4) Date: Feb. 5, 2014

(87) PCT Pub. No.: WO2013/051103
PCT Pub. Date: Apr. 11, 2013

(65) Prior Publication Data
US 2014/0203637 A1 Jul. 24, 2014

(51) Int. Cl.
| | |
|---|---|
| B60L 1/00 | (2006.01) |
| B60L 11/18 | (2006.01) |
| H02J 7/00 | (2006.01) |
| B60L 3/00 | (2006.01) |
| B60L 15/20 | (2006.01) |

(52) U.S. Cl.
CPC ............. *B60L 11/18* (2013.01); *B60L 3/0046* (2013.01); *B60L 11/1853* (2013.01); *B60L 11/1866* (2013.01); *B60L 15/2045* (2013.01); *H02J 7/00* (2013.01); *Y02T 10/7005* (2013.01); *Y02T 10/7061* (2013.01); *Y02T 10/7283* (2013.01)

(58) Field of Classification Search
USPC .................................. 307/9.1, 10.1, 87, 115
See application file for complete search history.

(56) References Cited

U.S. PATENT DOCUMENTS 7,667,351 B2 * 2/2010 Marwali et al. ................. 307/87
8,072,725 B2 * 12/2011 Kosaki et al. ................ 361/93.1

FOREIGN PATENT DOCUMENTS

| JP | H10-123225 A | 5/1998 |
| JP | A 2005-210840 | 8/2005 |
| JP | 2008-226511 A | 9/2008 |
| JP | A 2009-131077 | 6/2009 |
| JP | 2011-091894 A | 5/2011 |

* cited by examiner

*Primary Examiner* — Danny Nguyen
(74) *Attorney, Agent, or Firm* — Oliff PLC

(57) ABSTRACT

First and second system main relays are connected between a first power storage device and a second power storage device, respectively, and a first power line. First and second relays for charging are connected between first and second power storage devices, respectively, and a second power line. A control device selectively forms any of a first power feed path formed by connecting each of the first and second power storage devices to the first power line, and a second power feed path formed by connecting, to the first power line, one of the first and second power storage devices connected in parallel when the first and second relays are turned ON, thereby ensuring a power feed path to the load.

13 Claims, 4 Drawing Sheets

FIG.2
|  | SMR1 | SMR2 | CHR1 | CHR2 |
|---|---|---|---|---|
| PATH PA | ON | ON | OFF | OFF |
| PATH PB1 | ON | OFF | ON | ON |
| PATH PB2 | OFF | ON | ON | ON |
FIG.3
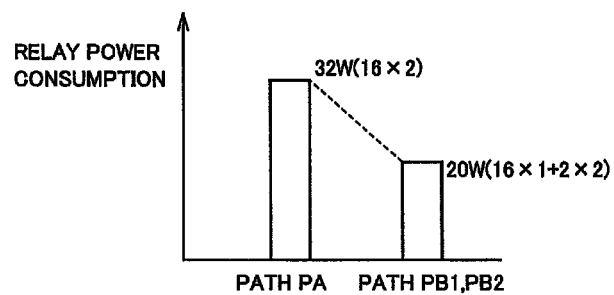
FIG.4
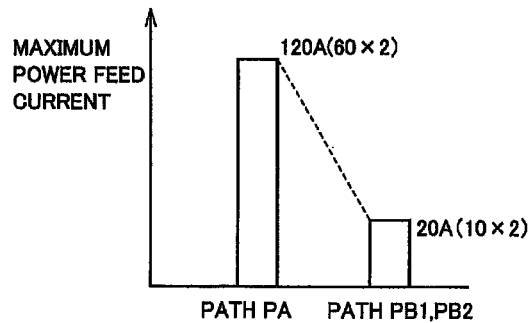

POWER SUPPLY SYSTEM FOR ELECTRIC POWERED VEHICLE AND METHOD FOR CONTROLLING THE SAME

TECHNICAL FIELD

This invention relates to a power supply system for an electric powered vehicle and a method for controlling the power supply system; more specifically, the invention relates to a power supply system for an electric powered vehicle on which a plurality of power storage devices are mounted.

BACKGROUND ART

In recent years, electric powered vehicles such as an electric vehicle, a hybrid vehicle, a fuel cell vehicle, and the like are attracting attention as environmentally friendly vehicles. These electric powered vehicles each include an electric motor that generates vehicle driving force, and a power storage device that stores electric power supplied to the electric motor. A hybrid vehicle additionally includes an internal combustion engine together with an electric motor as a power source, and a fuel cell vehicle includes a fuel cell as a DC power supply for driving the vehicle.

To extend the mileage that an electric powered vehicle can run with electric power of a power storage device, it is necessary to mount a plurality of power storage devices on the vehicle to achieve an increased capacity. Japanese Patent Laying-Open No. 2009-131077 (PTD 1) and Japanese Patent Laying-Open No. 2005-210840 (PTD 2), for example, each disclose the configuration of a vehicle on which a plurality of power storage devices (batteries) are mounted.

PTD 1, in particular, describes the configuration of a power supply apparatus for a vehicle that can reduce loss in charging at the time of charging the plurality of power storage devices from a power supply external to the vehicle.

PTD 2 describes a configuration that can achieve an increased torque when required, by selecting between a parallel connection and a series connection of the plurality of batteries without using a boost converter.

CITATION LIST

Patent Document

PTD 1: Japanese Patent Laying-Open No. 2009-131077
PTD 2: Japanese Patent Laying-Open No. 2005-210840

SUMMARY OF INVENTION

Technical Problem

As disclosed in PTD 1, when the plurality of power storage devices connected in parallel are used, it is necessary to turn on relays provided for the respective power storage devices. In the configuration according to PTD 2 as well, it is necessary to turn on two relays when two power storage devices (batteries) are connected in parallel.

In the configurations according to PTDs 1 and 2, however, as the number of relays that are turned ON when using power storage devices connected in parallel increases, the power feeding paths formed become more fixed. Particularly when relays with relatively large current capacity are fixedly used, an increase in power loss due to an increased number of relays may reduce the energy efficiency during running of a vehicle.

This invention was made to solve the problem as described above, and an object of this invention is to improve the energy efficiency of a vehicle by reducing power loss of switches (relays) in a power supply system for an electric powered vehicle in which a plurality of power storage devices connected in parallel are used.

Solution to Problem

According to this invention, a power supply system for an electric powered vehicle on which an electric motor for driving the vehicle is mounted includes a power control unit, first and second power storage devices, first to third switches, and a control unit. The power control unit is connected between a first power line and the electric motor, and configured to control driving of the electric motor. The first and second power storage devices are connected in parallel to the first power line. The first switch is connected between the first power storage device and the first power line. The second switch is connected between the second power storage device and the first power line. The third switch is disposed between a second power line supplied with charging electric power for charging the first and second power storage devices, and the first power storage device and the second power storage device. The control unit controls ON and OFF states of the first to third switches, so as to selectively form any of a first power feed path formed by connecting each of the first and second power storage devices to the first power line, and a second power feed path formed by connecting, to the first power line, one of the first and second power storage devices connected in parallel when the third switch is turned ON.

Preferably, the power supply system for an electric powered vehicle further includes a charger. The charger is configured to convert electric power supplied from outside the electric powered vehicle into charging electric power for the first and second power storage devices, and output the converted electric power to the second power line. The third switch includes a first charging switch connected between the second power line and the first power storage device, and a second charging switch connected between the second power line and the second power storage device. The second power feed path includes a first path formed by turning ON the first and second charging switches and the first switch while turning OFF the second switch, and a second path formed by turning ON the first and second charging switches and the second switch while turning OFF the first switch.

Moreover, preferably, the control unit selects, during running of the electric powered vehicle, any of the first and second power feed paths, in accordance with an input/output current between the first and second power storage devices, and the power control unit.

Furthermore, preferably, the control unit selects the second power feed path when the input/output current is lower than a prescribed determination value, and selects the first power feed path when the input/output current is higher than the determination value. Furthermore, preferably, the determination value is not more than a current value that is twice as high as a rated current of the third switch.

Alternatively, preferably, the control unit controls the first and second switches to equally turn ON the first and second switches at the time of switching from the first power feed path to the second power feed path, and fix ON and OFF states of the first and second switches while the second power feed path is being selected.

Preferably, the power consumption when the third switch is turned ON is lower than power consumption when the first switch is turned ON and power consumption when the second switch is turned ON.

According to another aspect of this invention, in a method for controlling a power supply system for an electric powered vehicle on which an electric motor for driving the vehicle is mounted, the electric powered vehicle includes a power control unit connected between a first power line and the electric motor, and configured to control driving of the electric motor, a first power storage device and a second power storage device connected in parallel to the first power line, a first switch connected between the first power storage device and the first power line, a second switch connected between the second power storage device and the first power line, and a third switch disposed between a second power line supplied with charging electric power for charging the first and second power storage devices, and the first power storage device and the second power storage device. The controlling method includes the step of controlling ON and OFF states of the first to third switches, so as to selectively form any of a first power feed path formed by connecting each of the first and second power storage devices to the first power line, and a second power feed path formed by connecting, to the first power line, one of the first and second power storage devices connected in parallel when the third switch is turned ON.

Preferably, the controlling method further includes the step of acquiring, during running of the electric powered vehicle, an input/output current between the first and second power storage devices, and the power control unit. In the controlling step, any of the first and second power feed paths is selected in accordance with the input/output current.

Furthermore, preferably, the selecting step includes the steps of selecting the second power feed path when the input/output current is lower than a prescribed determination value, and selecting the first power feed path when the input/output current is higher than the determination value. Preferably, the determination value is not more than a current value that is twice as high as a rated current of the third switch.

Alternatively, in the controlling step, the first and second switches are controlled so that, at the time of switching from the first power feed path to the second power feed path, the first and second switches are alternately turned ON, and, while the second power feed path is being selected, ON and OFF states of the first and second switches are fixed.

Preferably, power consumption when the third switch is turned ON is lower than power consumption when the first switch is turned ON and power consumption when the second switch is turned ON.

Advantageous Effects of Invention

According to this invention, the energy efficiency of a vehicle can be improved by reducing power loss of switches (relays) in a power supply system for an electric powered vehicle in which a plurality of power storage devices connected in parallel are used.

BRIEF DESCRIPTION OF DRAWINGS

FIG. 2 illustrates a table for explaining a plurality of power feed paths that can be selected during running of the vehicle.

FIG. 3 is a graph comparing relay power consumption between power feed paths.

FIG. 4 is a graph comparing maximum power supply current between power feed paths.

DESCRIPTION OF EMBODIMENTS

Figure 1:
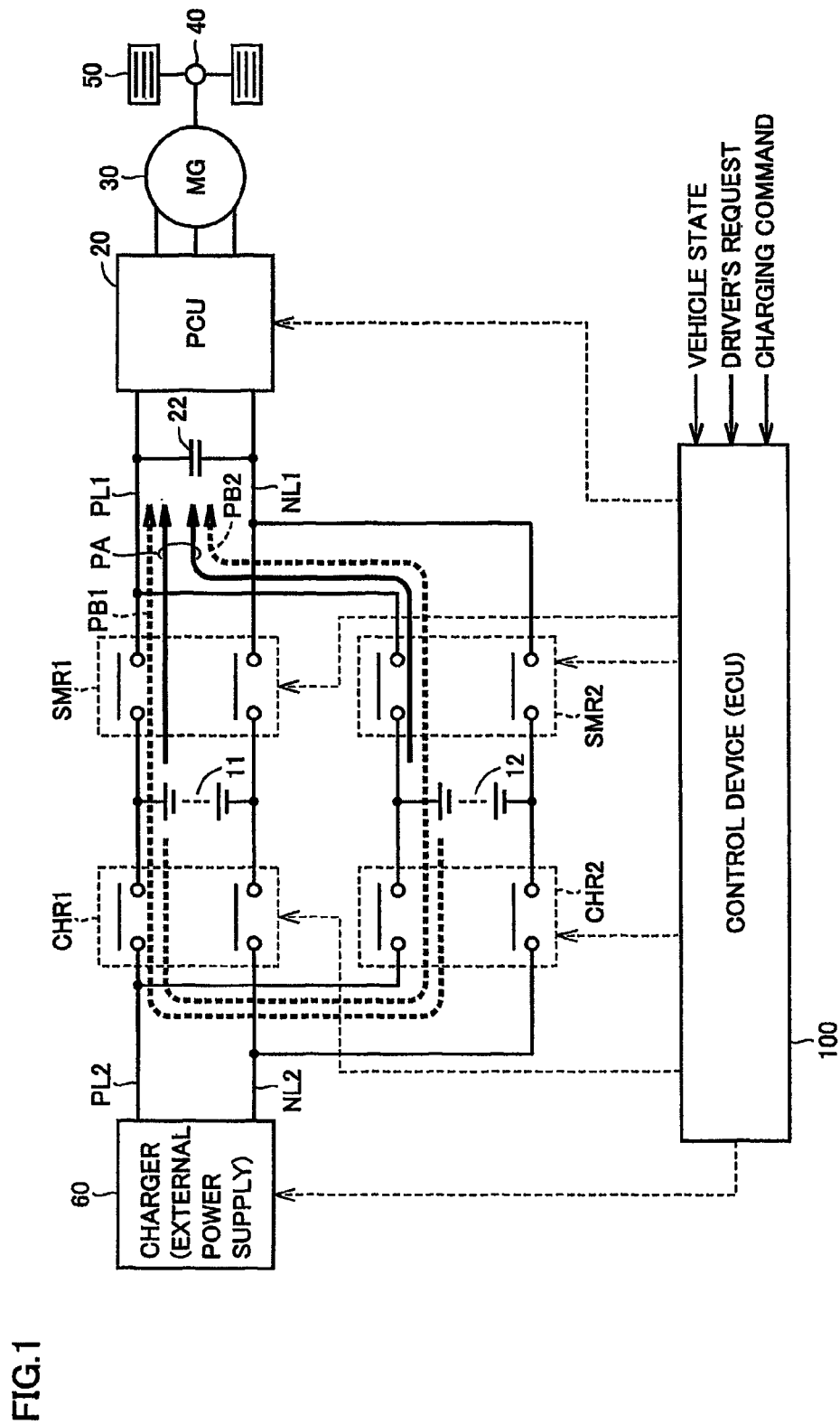
FIG. 1 is a schematic block diagram of a power supply system for an electric powered vehicle according to an embodiment of the present invention.

Embodiments of the present invention will be described hereinafter in detail with reference to the drawings. The same or corresponding parts in the drawings are hereinafter indicated with the same reference characters, and the description thereof will not be repeated in principle.

FIG. 1 is a schematic block diagram of a power supply system for an electric powered vehicle according to an embodiment of the present invention. FIG. 1 illustrates the configuration of the power supply system for controlling driving of an electric motor for driving the vehicle, of the electric powered vehicle.

Referring to FIG. 1, the power supply system for the electric powered vehicle includes power storage devices 11 and 12, a power control unit (PCU) 20, a motor generator 30, a power transmission gear 40, a driving wheel 50, a charger 60, and a control device 100.

Each of power storage devices 11 and 12 is typically formed of a rechargeable secondary battery such as a lithium ion battery, a nickel hydride battery, or the like. Each of power storage devices 11, 12 can also be formed of a power storage element other than the secondary battery.

Power storage devices 11 and 12 are connected in parallel to power lines PL1, NL1, with main relays SMR1, SMR2 being inserted therebetween. A smoothing capacitor 22 is connected to power lines PL1, NL1, and functions to smooth DC voltage.

PCU 20 and motor generator 30 disposed downstream of power lines PL1, NL1 correspond to electrical loads on power storage devices 11, 12.

PCU 20 converts DC electric power of power lines PL1, NL1 into electric power for controlling driving of motor generator 30. For example, motor generator 30 is formed of a permanent magnet type three-phase synchronous electric motor, and PCU 20 is formed of a three-phase inverter. Alternatively, PCU 20 may be formed of a combination of a converter that is connected between power lines PL1, NL1 and the inverter and executes bidirectional DC voltage conversion, with the three-phase inverter that converts output voltage of the converter into AC voltage.

An output torque of motor generator 30 is transmitted through power transmission gear 40 that is formed of a reduction gear or a power split device to driving wheel 50, causing the electric powered vehicle to run.

At the time of regenerative braking of the electric powered vehicle, motor generator 30 can generate electric power by rotational force of driving wheel 50. The generated electric power is then converted by PCU 20 into charging electric power for power storage devices 11, 12.

Further, in a hybrid vehicle on which an engine (not shown) is mounted in addition to motor generator 30, required vehicle driving force for the electric powered vehicle is generated by coordinated operation of the engine and motor generator 30. At this time, power storage devices 11, 12 can also be charged with electric power generated by rotation of the engine. That is, the electric powered vehicle represents a vehicle on which an electric motor for generating vehicle driving force is mounted, and includes a hybrid vehicle in which the vehicle driving force is generated by an engine and an electric motor, an electric vehicle and a fuel cell vehicle on which an engine is not mounted, and the like.

Main relay SMR1 is connected between power lines PL1, NL1 and power storage device 11. Similarly, main relay SMR2 is connected between power lines PL1, NL1 and power storage device 12.

Power storage devices 11 and 12 are also connected in parallel to power lines PL2, NL2, which are different from power lines PL1, NL1, with relays CHR1, CHR2 being inserted therebetween. Relay CHR1 is connected between power storage device 11 and power lines PL2, NL2. Similarly, relay CHR2 is connected between power storage device 12 and power lines PL2, NL2. When relays CHR1, CHR2 are turned ON, power storage devices 11 and 12 can be connected in parallel by bypassing power lines PL1, NL1.

The ON and OFF states of main relays SMR1, SMR2 and relays CHR1, CHR2 are controlled by control device 100. Each of the main relays and the relays is typically formed of an electromagnetic relay that is closed (turned ON) when excitation current is supplied from a not-shown excitation circuit, and is opened when excitation current is not supplied. It is noted, however, that any circuit element can be used instead, so long as it is a switch that can control connection (ON)/disconnection (OFF) of a conduction path.

Control device 100 is formed of an electronic control unit (ECU) that incorporates a not-shown CPU (Central Processing Unit) and a memory. The ECU is configured to perform operation processing using detection values from various sensors, based on a map and a program stored in the memory. Alternatively, at least a portion of the ECU may be configured to execute prescribed numerical/logical operation processing by means of hardware such as an electronic circuit.

Control device 100 controls the operation of various devices so as to put the electric powered vehicle in a desired running state, in accordance with a vehicle state and a driver's request. In the power supply system illustrated in FIG. 1, control device 100 generates a signal for controlling the operation of PCU 20 and charger 60, in addition to a signal for controlling the ON and OFF states of each main relay and each relay.

In the configuration illustrated in FIG. 1, power lines PL1, NL1 correspond to "a first power line", and power lines PL2, NL2 correspond to "a second power line". Main relay SMR1 corresponds to "a first switch", and main relay SMR2 corresponds to "a second switch". Relays CHR1 and CHR2 correspond to "a third switch"; particularly, relay CHR1 corresponds to "a first charging switch", and relay CHR2 corresponds to "a second charging switch".

Power lines PL2, NL2 are connected to charger 60 for charging power storage devices 11, 12 with a power supply external to the electric powered vehicle (hereinafter also referred to as the "external power supply"). At the time of charging power storage devices 11, 12 with the external power supply, charger 60 converts the electric power from the not-shown external power supply into charging electric power for power storage device 11 and/or 12, and outputs the converted electric power to power lines PL2, NL2. Charger 60 can adopt any circuit configuration, so long as it can convert the electric power from the external power supply into charging electric power for power storage devices 11, 12.

As the external power supply, a commercial AC power supply, or a DC power supply such as a solar battery, a domestic storage battery, or the like can be used. Alternatively, electric power can be supplied to charger 60 from the external power supply in a non-contact manner, without using a charging cable. It is noted that depending on the type of the external power supply, electric power from the external power supply can also be directly supplied to power lines PL2, NL2, without passing charger 60, or without charger 60 being disposed.

During running of the vehicle, when main relays SMR1, SMR2 are turned ON, power storage devices 11, 12 are connected in parallel to power lines PL1, NL1. On the other hand, at the time of charging, when relays CHR1, CHR2 are turned ON, power storage devices 11, 12 can be charged in parallel with the charging electric power from charger 60.

Generally, current that is input to and output from power storage devices 11, 12 during running of the vehicle is larger than charging current at the time of charging power storage devices 11, 12 with the external power supply. Each of main relays SMR1, SMR2 therefore has a current rating larger than the current rating of each of relays CHR1, CHR2 for charging. Consequently, power consumption when each of main relays SMR1, SMR2 is turned ON is greater than power consumption when each of relays CHR1, CHR2 is turned ON.

In the following, the current rating of each of main relays SMR1, SMR2 is denoted as X1 (A), and the current rating of each of relays CHR1, CHR2 is denoted as X2 (A). By way of example, it is hereinafter assumed that X1=60 (A) and X2=10 (A). Power consumption when each of main relays SMR1, SMR2 is turned ON is denoted as Z1 (W), and power consumption when each of relays CHR1, CHR2 is turned ON is denoted as Z2 (W). By way of example, it is hereinafter assumed that $$Z1=16(W) \text{ and } Z2=2(W).$$

In the power supply system illustrated in FIG. 1, during running of the vehicle, the power feed path between parallel-connected power storage devices 11, 12 and power lines PL1, NL1 can be switched, by switching between the ON and OFF states of main relays SMR1, SMR2 and relays CHR1, CHR2. Specifically, power feed paths PA, PB1, PB2 can be selectively formed. FIG. 2 illustrates a combination of the ON and OFF states of each of main relays SMR1, SMR2 and each of relays CHR1, CHR2, for forming each power feed path.

Referring to FIGS. 1 and 2, basic power feed path PA is formed by turning ON main relays SMR1 and SMR2, and turning OFF relays CHR1 and CHR2. With power feed path PA, power storage devices 11, 12 are used in parallel in such a manner that power storage devices 11 and 12 are connected to power lines PL1, NL1, respectively. That is, power feed path PA corresponds to "a first power feed path".

On the other hand, even if one of main relays SMR1 and SMR2 is turned OFF, power feed path PB1 or PB2 can be formed by turning ON relays CHR1 and CHR2. Specifically, when SMR1 is turned ON and SMR2 is turned OFF, power feed path PB1 from power storage device 12 to relay CHR2 to relay CHR1 to power storage device 11 to main relay SMR1 to power lines PL1, NL1 can be formed.

On the other hand, when main relay SMR2 is turned ON and SMR1 is turned OFF, power feed path PB2 from power storage device 11 to relay CHR1 to relay CHR2 to power storage device 12 to main relay SMR2 to power lines PL1, NL1 can be formed. With both power feed paths PB1 and PB2, power storage devices 11 and 12 can be connected in parallel to power lines PL1, NL1, as with power feed path PA.

With power feed paths PB1, PB2, power storage devices 11 and 12 connected in parallel via relays CHR1, CHR2 are used in parallel, in such a manner that only one of the power storage devices is connected to power line PL1 or NL1. That is, each of power feed paths PB1 and PB2 corresponds to "a second power feed path".

FIG. 3 shows a comparison of relay power consumption between power feed path PA and power feed paths PB1, PB2, and FIG. 4 shows a comparison of maximum power feed current between power feed path PA and power feed paths PB1, PB2.

With power feed path PA, the two main relays SMR1, SMR2 are turned ON while relays CHR1, CHR2 are turned OFF. As shown in FIG. 3, therefore, the relay power consumption on power feed path PA is Z1×2=32 (W).

With power feed path PA, a current corresponding to the current rating of main relays SMR1, SMR2 can be input to and output from power storage devices 11 and 12, respectively. As shown in FIG. 4, therefore, the maximum power feed current on power feed path PA is X1×2=120 (A).

As opposed to this, with power feed path PB1 or PB2, relays CHR1, CHR2 are turned OFF while only one of main relays SMR1, SMR2 is turned ON. As shown in FIG. 3, therefore, the relay power consumption on power feed path PA is Z1×1+Z2×2=20 (W). As in this case, where the total power consumption of relays CHR1, CHR2 is lower than the power consumption of one of main relays SMR1, SMR2 (namely, Z2×2<Z1), power loss due to the relay power consumption is lower on power feed paths PB1, PB2 than on power feed path PA.

Moreover, with power feed path PB1 or PB2, relays CHR1, CHR2 are connected in series, so that the current rating of the entire relays is current rating X2 (A) of each relay. Note, however, that a current from only one of power storage devices 11 and 12 passes through serially-connected relays CHR1, CHR2.

Since an equal current is input to and output from parallel-connected power storage devices 11, 12, electric power that is twice as high as X2 (A) can be input to and output from the entire power storage devices 11, 12. As shown in FIG. 4, therefore, the maximum power feed current on power feed paths PB1, PB2 is X2×2=20 (A).

Thus, when power feed path PA is selected, a large current can be supplied to power lines PL1, NL1 (namely, PCU 20 and motor generator 30), even though the relay power consumption is high. Acceleration performance with the output torque of motor generator 30 can thus be ensured. On the other hand, when power feed paths PB1, PB2 are selected, the relay power consumption can be reduced, even though the amount of current supplied to a load (PCU 20) decreases.

As described above, with the power supply system for an electric powered vehicle according to the present embodiment, even if one of main relays SMR1, SMR2 with high power consumption is turned OFF, power feed paths PB1, PB2 can be formed using relays CHR1, CHR2 with low power consumption. Hence, as compared with the configuration in which main relays SMR1, SMR2 are fixedly turned ON, power loss of the switches (relays) can be reduced to improve the energy efficiency of a vehicle. Particularly, the above-described effects can be achieved using relays CHR1, CHR2 disposed for charging, without providing additional relays. Furthermore, even where a malfunction occurs in one of main relays SMR1, SMR2, power feed path PB1 or PB2 allows continued running using power storage devices 11, 12.

Figure 5:
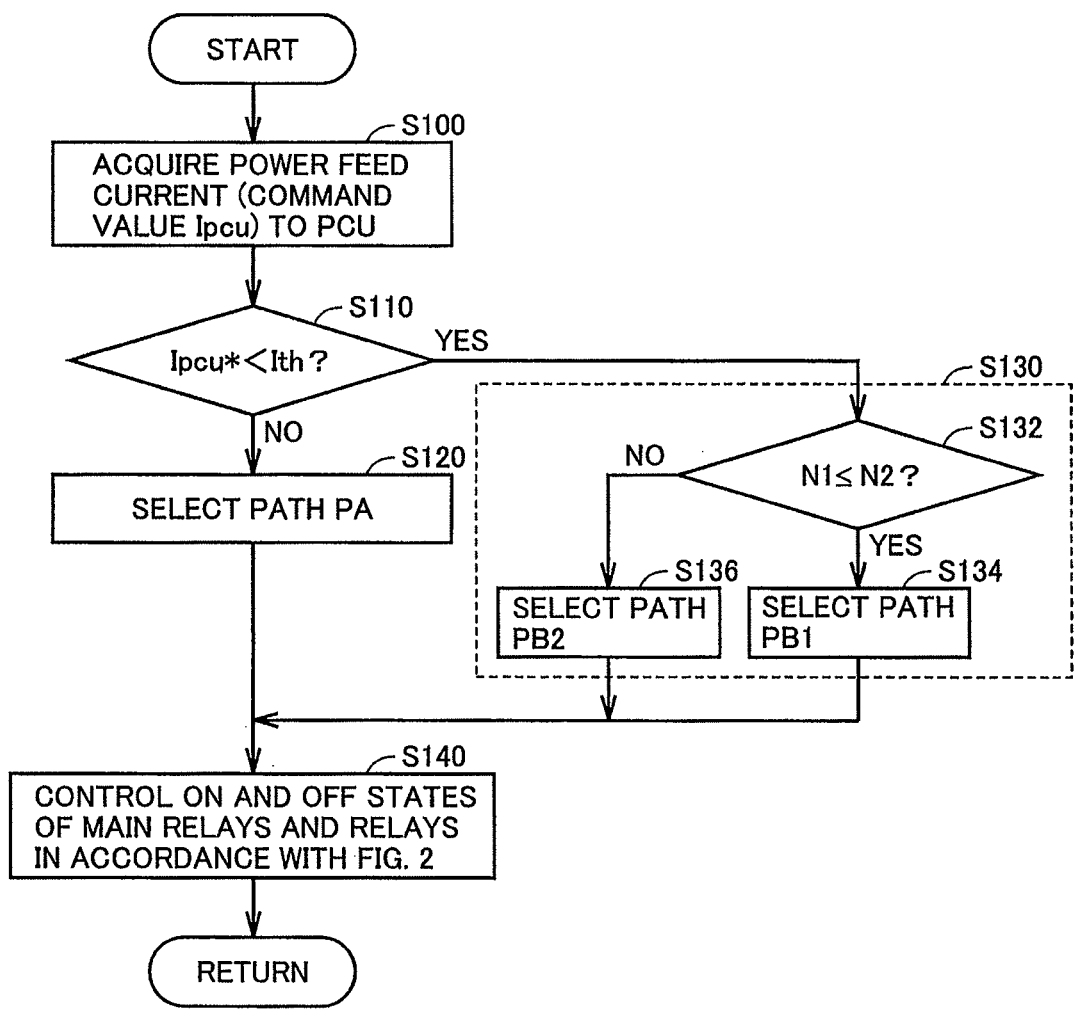
FIG. 5 is a flowchart for illustrating control for selecting a power feed path during running of the vehicle in the power supply system for the electric powered vehicle according to the embodiment of the present invention.

FIG. 5 illustrates one example of control processing for selecting a power feed path during running of the vehicle in the power supply system for the electric powered vehicle according to the embodiment of the present invention. The control processing illustrated in FIG. 5 is executed by control device 100 in prescribed cycles.

Referring to FIG. 5, control device 100 acquires, at Step S100, an input/output current Ipcu (or a predicted value or command value thereof) between the entire power storage devices 11, 12 and PCU 20 (load). Input/output current Ipcu corresponds to a power feed current to the load with the entire power storage devices 11, 12.

For example, a command value of power feed current from power storage devices 11, 12 to PCU 20 can be calculated in accordance with power distribution that determines assigned power (charge and discharge electric power) for the entire power storage devices 11, 12, with respect to requested power for the vehicle as a whole that is found based on a running state (an accelerator pedal position, a vehicle speed, etc.) of the electric powered vehicle.

At Step S100, therefore, a current command value Ipcu* found by the above-described calculation can be acquired. For example, current command value Ipcu* can be found by dividing the charge and discharge electric power requested for the entire power storage devices 11, 12 in accordance with the power distribution, by an output voltage of parallel-connected power storage devices 11, 12.

At Step S110, control device 100 compares current command value Ipcu* found at Step S100, with a prescribed current determination value Ith.

Figure 6:
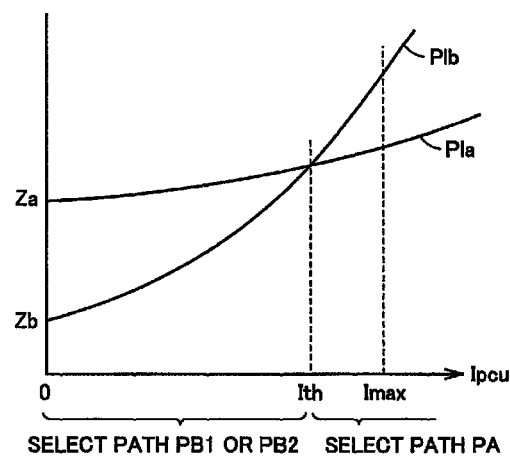
FIG. 6 is a conceptual diagram for explaining setting of a current determination value that involves selecting a power feed path.

FIG. 6 conceptually illustrates a technique of setting current determination value Ith.

Referring to FIG. 6, power loss Pla represents a relationship between current Ipcu and power loss on power feed path PA. Similarly, power loss Plb represents a relationship between current Ipcu and power loss on power feed paths PB1, PB2.

When Ipcu=0, Pla=Za and Plb=Zb. Za and Zb correspond to relay power losses (FIG. 3) on power feed path PA and on power feed paths PB1, PB2, respectively.

Moreover, when current Ipcu increases, power losses Pla, Plb increase in proportion to the square of the current. The characteristics illustrated in FIG. 6 are based on the assumption that since power feed paths PB1, PB2 are longer than power feed path PA, losses on the power lines (cables) increase.

Moreover, current Imax corresponds to a maximum power feed current (20 (A) in FIG. 4) on power feed paths PB1, PB2. To supply a current in accordance with current command value Ipcu*, it is necessary to set current determination value Ith to be not more than current Imax (Ith≤Imax).

Furthermore, as illustrated in FIG. 6, where there is a region of Plb>Pla in the range of Ipcu<Imax, it is preferred to determine current determination value Ith to correspond to a current value at which Pla and Plb are reversed.

On the other hand, unlike the characteristics illustrated in FIG. 6, where Pla>Plb always holds in the range of Ipcu<Imax, it is preferred to set Ith=Imax.

Referring again to FIG. 5, when current command value Ipcu* is greater than current determination value Ith (when it is determined to be NO at S110), control device 100 causes the processing to proceed to Step S120, where it selects power feed path PA.

On the other hand, where current command value Ipcu* is lower than current determination value Ith (when it is determined to be YES at S110), control device 100 selects power feed path PB1 or PB2 at Step S130.

Step S130 has steps S132 through S136 for determining any of power feed paths PB1 and PB2. Note that although not illustrated in the figure, selection of power feed paths PB1, PB2 through Steps S132 to S136 is executed only in a control cycle in which the determination result at Step S110 has changed from "NO" to "YES", that is, at the time of switching from power feed path PA to power feed paths PB1, PB2. On the other hand, within a period during which the determination result at Step S110 is maintained as "YES", that is, while the selection of power feed paths PB1, PB2 is being maintained, the processing through Steps S132 to S136 is skipped, and power feed path PB1 or PB2 selected at that point is maintained.

At Step S132, control device 100 compares the number of times N1 that power feed path PB1 was previously selected and the number of times N2 that power feed path PB2 was previously selected. When N1≤N2, control device 100 causes the processing to proceed to Step S134, where it selects power feed path PB1 this time.

On the other hand, when N2<N1 (when it is determined to be NO at S132), control device 100 causes the processing to proceed to Step S136, where it selects power feed path PB2 this time.

That is, the processing through Steps S132 to S136 is executed such that power feed paths PB1 and PB2 are selected equally. Hence, the determination at Step S132 may be made such that power feed paths PB1 and PB2 are selected alternately whenever the determination result S110 changes from "NO" to "YES". This equalizes the numbers of times that main relays SMR1, SMR2 are turned ON, thereby potentially extending the device lifetime.

Furthermore, at Step S150, control device 100 controls the ON and OFF states of each of main relays SMR1, SMR2 and relays CHR1, CHR2 in accordance with FIG. 2, for forming power feed path PA, PB1, or PB2 that follows the selection result.

In this way, a power feed current that follows current command value Ipcu* is ensured, and power loss due to the relay consumption power can be reduced by selecting power feed paths PB1, PB2.

As described above, with the power supply system for an electric powered vehicle according to the present embodiment, in an electric power system that supplies electric power to a plurality of power storage devices connected in parallel, power feed paths from power storage devices 11, 12 to the load can be formed, even if main relay SMR1 or SMR2 is turned OFF, so that power loss of the switches (relays) can be reduced to improve the energy efficiency of a vehicle. Particularly, the configuration of the power supply system is effective since power feed paths when main relays SMR1, SMR2 are turned OFF can be formed using relays CHR1, CHR2 disposed for charging, without providing additional relays. Furthermore, even where a malfunction occurs in one of main relays SMR1, SMR2, power feed path PB1 or PB2 allows continued running using power storage devices 11, 12, thus leading to an improved degree of freedom of the power supply system.

It is to be understood that the embodiments disclosed herein are only by way of example, and not to be taken by way of limitation. The scope of the present invention is defined by the terms of the claims, rather than the description above, and is intended to include any modifications within the scope and meaning equivalent to the terms of the claims.

INDUSTRIAL APPLICABILITY

This invention can be applied to a power supply system for an electric powered vehicle on which a plurality of power storage devices are mounted.

REFERENCE SIGNS LIST 11, 12: power storage device; 20: power control unit (PCU); 22: smoothing capacitor; 30: motor generator; 40: power transmission gear; 50: driving wheel; 60: charger; 100: control device (ECU); CHR1, CHR2: relay; Ipcu: power feed current; Ipcu*: power feed current command value; Ith: current determination value; PA, PB1, PB2: power feed path; NL1, NL2, PL1, PL2: power line; Pla, Plb: power loss; SMR1, SMR2: main relay.

The invention claimed is:

1. A power supply system for an electric powered vehicle on which an electric motor for driving the vehicle is mounted, comprising:
    a power control unit connected between a first power line and said electric motor, and configured to control driving of said electric motor;
    a first power storage device and a second power storage device connected in parallel to said first power line;
    a first switch connected between said first power storage device and said first power line;
    a second switch connected between said second power storage device and said first power line;
    a third switch disposed between a second power line supplied with charging electric power for charging said first and second power storage devices, and said first power storage device and said second power storage device; and
    a control unit for controlling ON and OFF states of said first to third switches, so as to selectively form any of a first power feed path formed by connecting each of said first and second power storage devices to said first power line, and a second power feed path formed by connecting, to said first power line, one of said first and second power storage devices connected in parallel when said third switch is turned ON.

2. The power supply system for an electric powered vehicle according to claim 1, further comprising:
    a charger for converting electric power supplied from outside said electric powered vehicle into charging electric power for said first and said second power storage devices, and outputting the converted electric power to said second power line, wherein
    said third switch includes:
    a first charging switch connected between said second power line and said first power storage device; and
    a second charging switch connected between said second power line and said second power storage device, and
    said second power feed path includes a first path formed by turning ON said first and second charging switches and said first switch while turning OFF said second switch, and a second path formed by turning ON said first and second charging switches and said second switch while turning OFF said first switch.

3. The power supply system for an electric powered vehicle according to claim 1, wherein
    said control unit selects, during running of said electric powered vehicle, any of said first and second power feed paths, in accordance with an input/output current between said first and second power storage devices, and said power control unit.

4. The power supply system for an electric powered vehicle according to claim 3, wherein
    said control device selects' said second power feed path when said input/output current is lower than a prescribed determination value, and selects said first power feed path when said input/output current is higher than said determination value.

5. The power supply system for an electric powered vehicle according to claim 4, wherein
    said determination value is not more than a current value that is twice as high as a rated current of said third switch.

6. The power supply system for an electric powered vehicle according to claim 3, wherein
said control unit controls said first and second switches to equally turn ON said first and second switches at the time of switching from said first power feed path to said second power feed path, and fix ON and OFF states of said first and second switches while said second power feed path is being selected.

7. The power supply system for an electric powered vehicle according to claim 1, wherein
power consumption when said third switch is turned ON is lower than power consumption when said first switch is turned ON and power consumption when said second switch is turned ON.

8. A method for controlling a power supply system for an electric powered vehicle on which an electric motor for driving the vehicle is mounted,
said electric powered vehicle comprising:
a power control unit connected between a first power line and said electric motor, and configured to control driving of said electric motor;
a first power storage device and a second power storage device connected in parallel to said first power line;
a first switch connected between said first power storage device and said first power line;
a second switch connected between said second power storage device and said first power line; and
a third switch disposed between a second power line supplied with charging electric power for charging said first and second power storage devices, and said first power storage device and said second power storage device;
said method comprising the step of:
controlling ON and OFF states of said first to third switches, so as to selectively form any of a first power feed path formed by connecting each of said first and second power) storage devices to said first power line, and a second power feed path formed by connecting, to said first power line, one of said first and second power storage devices connected in parallel when said third switch is turned ON.

9. The method for controlling a power supply system for an electric powered vehicle according to claim 8, further comprising the step of acquiring, during running of said electric powered vehicle, an input/output current between said power control unit and said first and second power devices, wherein
in said controlling step, any of said first and second power feed paths is selected in accordance with said input/output current.

10. The method for controlling a power supply system for an electric powered vehicle according to claim 9, wherein
said controlling step includes:
the step of selecting said second power feed path when said input/output current is lower than a prescribed determination value; and
the step of selecting said first power feed path when said input/output current is higher than said determination value.

11. The method for controlling a power supply system for an electric powered vehicle according to claim 10, wherein
said determination value is not more than a current value that is twice as high as a rated current of said third switch.

12. The method for controlling a power supply system for an electric powered vehicle according to claim 9, wherein
in said controlling step, said first and second switches are controlled so that, at the time of switching from said first power feed path to said second power feed path, said first and second switches are alternately turned ON, and, while said second power feed path is being selected, ON and OFF states of said first and second switches are fixed.

13. The method for controlling a power supply system for an electric powered vehicle according to claim 8, wherein
power consumption when said third switch is turned ON is lower than power consumption when said first switch is turned ON and power consumption when said second switch is turned ON.

* * * * *